(12) United States Patent
Insley et al.

(10) Patent No.: US 6,752,889 B2
(45) Date of Patent: Jun. 22, 2004

(54) CONTOURED LAYER CHANNEL FLOW FILTRATION MEDIA

(75) Inventors: Thomas I. Insley, West Lakeland Twp., MN (US); Todd W. Johnson, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/866,825

(22) Filed: May 29, 2001

(65) Prior Publication Data

US 2003/0118781 A1 Jun. 26, 2003

Related U.S. Application Data

(62) Division of application No. 09/240,123, filed on Jan. 29, 1999, now Pat. No. 6,280,824.

(51) Int. Cl.⁷ .................. B32B 31/10; B32B 31/18; B32B 33/00
(52) U.S. Cl. ............... 156/182; 156/251; 493/941
(58) Field of Search ................... 156/182, 251, 156/155, 233.1, 308.4, 159, 183, 205, 207, 282, 269, 272.6, 273.1, 290; 55/288, 521, 308, 318, 320, 323; 428/182, 183; 34/82; 95/286; 264/145, 152, 349, 286, 484, 485, 32, 158, 171.12, DIG. 48, DIG. 52, 423, 424, 182; 493/941

(56) References Cited

U.S. PATENT DOCUMENTS

| | | | |
|---|---|---|---|
| 3,550,257 A | 12/1970 | Brown et al. | |
| 3,594,863 A | 7/1971 | Von Hofe | |
| 4,125,682 A | 11/1978 | Bordet et al. | |
| 4,234,324 A | 11/1980 | Dodge, Jr. | |
| 4,249,919 A | * 2/1981 | Kalt ............... | 96/390 |
| RE30,782 E | 10/1981 | van Turnhout | |
| 4,313,741 A | 2/1982 | Masuda et al. | |
| 4,319,952 A | * 3/1982 | Schjeldahl ......... | 156/510 |
| 4,372,000 A | * 2/1983 | Hurd ............... | 449/43 |
| RE31,285 E | 6/1983 | van Turnhout et al. | |
| 4,592,815 A | 6/1986 | Nakao | |
| 4,668,558 A | 5/1987 | Barber | |
| 4,775,310 A | 10/1988 | Fischer | |
| 4,950,549 A | 8/1990 | Rolando et al. | |
| 5,025,052 A | 6/1991 | Crater et al. | |
| 5,039,567 A | * 8/1991 | Landi et al. ....... | 156/197 |
| 5,057,710 A | 10/1991 | Nishiura et al. | |
| 5,069,404 A | 12/1991 | Bouchard | |
| 5,077,870 A | 1/1992 | Melbye et al. | |
| 5,078,925 A | 1/1992 | Rolando et al. | |
| 5,099,026 A | 3/1992 | Crater et al. | |
| 5,133,516 A | 7/1992 | Marentic et al. | |
| 5,158,030 A | 10/1992 | DuBois et al. | |
| 5,256,231 A | 10/1993 | Gorman et al. | |
| 5,319,475 A | * 6/1994 | Kay et al. ......... | 359/2 |
| 5,324,465 A | * 6/1994 | Duffy et al. ....... | 264/138 |
| 5,405,434 A | 4/1995 | Inculet | |
| 5,472,481 A | 12/1995 | Jones et al. | |
| 5,496,507 A | 3/1996 | Angadjivand et al. | |
| 5,514,120 A | 5/1996 | Johnston et al. | |
| 5,691,846 A | 11/1997 | Benson, Jr. et al. | |
| 6,524,488 B1 | * 2/2003 | Insley et al. ....... | 210/767 |

FOREIGN PATENT DOCUMENTS

| | | |
|---|---|---|
| EP | 0 582 286 A1 | 2/1994 |
| GB | 2 308 320 A | 6/1997 |
| JP | 56-10312 | 2/1981 |
| JP | 56-10313 | 2/1981 |
| JP | 56-10314 | 2/1981 |
| JP | 58-175560 | 10/1983 |
| JP | 59-228919 | 12/1984 |
| JP | 3-238011 | 10/1991 |
| JP | 4-4011 | 1/1992 |
| JP | 4-176310 | 6/1992 |
| JP | 7-144108 | 6/1995 |
| JP | 7-213945 | 8/1995 |
| JP | 07241491 | 9/1995 |
| JP | 7-241491 | 9/1995 |
| JP | 8-713450 | 3/1996 |
| JP | 10-174823 | 6/1998 |
| JP | 11090133 | 4/1999 |
| WO | WO 94/22557 | 10/1994 |

\* cited by examiner

*Primary Examiner*—Richard Crispino
*Assistant Examiner*—Sing P Chan
(74) *Attorney, Agent, or Firm*—Gary L. Griswold; Robert W. Sprague; William J. Bond

(57) ABSTRACT

A filtration media array is provided having at least one contoured polymeric film layer having surface structures. The film layers may be configured as a stack that has the contoured film layer defining a plurality of ordered inlet openings through a face of the stack and corresponding air pathways, thereby forming an open, porous volume. The air pathways may be defined by a plurality of flow channels formed by the contours of the structured contoured film layers.

5 Claims, 4 Drawing Sheets

CONTOURED LAYER CHANNEL FLOW FILTRATION MEDIA

This is a divisional of application Ser. No. 09/240,123 filed Jan. 29, 1999, now U.S. Pat. No. 6,280,824.

The present invention relates to a charged filtration media and devices comprising multiple layers of contoured polymeric film having a structure that defines highly ordered air pathways.

BACKGROUND OF THE INVENTION

Air filtration media generally relies on particle capture by contact with a filter media. This can occur by random impaction by a number of impaction mechanisms (e.g., direct interception, inertial impaction or diffusion) or by actively attracting particles to the media, generally by electrostatic attraction.

Filtration media relying on random impaction events generally show increased efficiency by increasing the surface area of the filtration media while decreasing the size of any open spaces available for fluid to pass without impacting the media. Generally, the most cost effective and common approach has been the use of fibrous filter media, particularly nonwoven fibrous filter media. Fluid is passed through the filter media resulting in particle capture by impaction with the fibrous media. The drawback of this approach is that higher capture efficiencies are typically realized at the expense of a high pressure drop created by the filter media flow resistance, which flow resistance can increase significantly over the lifetime of the filter.

Filtration relying exclusively on electrostatic attraction is exemplified by active charged conductive electrode plates separated by dielectric insulators such as described in U.S. Pat. Nos. 4,234,324 or 4,313,741. With these devices, inherently charged particles or particles induced with a charge, such as by an ionizer, are passed between flat charged electrode plates. These devices generally have very low pressure drops but are ineffective against uncharged particles and require a power source.

In order to capture some of the benefits of these electrostatic devices, it has also been proposed to induce permanent or temporary charges on a fibrous filter media by a variety of methods. Charged fiber filter media have increased efficiencies relative to comparable uncharged fiber filter media but when used in conventional flow through type filters, still have significant pressure drops due to flow resistance.

As a method of decreasing this flow resistance and associated pressure drop, it has been proposed to create flow through channel filters where the flow channels sidewalls are formed by particulate or sorbent filter media. Particles are captured when they contact these filter media sidewalls. In view of its increased particle capture capabilities, generally the particulate filtration media is an electret charged fibrous media, generally a nonwoven filter media formed of charged fibers. For example, Japanese Kokai 7-144108 (published Jun. 6, 1995) indicates that it is known to form honeycomb filters (e.g., pleated corrugated filter media resembling corrugated cardboard) from electret charged nonwoven filter media. This patent application proposes increasing the long tern efficiency of such a filter structure by forming it from a filter media laminate of charged meltblown fiber filter media and charged split fiber filter media (e.g., similar to that disclosed in U.S. Pat. No. RE 30,782). Japanese Kokai 7-241491 (published Sep. 19, 1995) proposes a honeycomb filter, as above, where the pleated layers and the flat layers forming the corrugated honeycomb structure are alternating layers of electret charged nonwoven filter media and sorbent filter media (activated carbon loaded sheet or the like), the activated carbon layer preferably is formed with a liner (e.g., a nonwoven) that may also be electret charged. Japanese Kokai 10-174823 (published Jun. 30, 1998) discloses another honeycomb type filter, as above, where the filter material forming the honeycomb structure is formed from a laminate of an electret charged nonwoven filter layer and an antibacterial filter layer. These honeycomb type filters are advantageous for uses where low pressure drop is critical and single pass filtration efficiency is less important; for example, recirculating type filters such as used in air conditioners, room air cleaners or the like. Generally, these honeycomb filters are formed by a process similar to that used to form cardboard where one filter media is pleated and glued at its peaks to a flat layer. The assemblies are then stacked or rolled up where adjacent laminate layers can be joined by glue or hot melt adhesive. The filtration media is charged by conventional techniques prior to forming the honeycomb structures.

A different approach to a flow through type filter is proposed in U.S. Pat. No. 3,550,257 where the charged filtration media is a film rather than a nonwoven filter media. The charged films are separated by spacers strips that are described as open cell foam webs of glass fibers or corrugated Kraft paper. The pressure drop is described as dependent on the porosity of the spacers and the space between the charged dielectric films. Japanese Kokai 56-10314 (published Feb. 2, 1981) discloses a similar structure where a corrugated honeycomb structure is formed with either or both the pleated or flat layers formed from a charged polymeric film (defined as a film or a nonwoven). The layers are adhered by melting the front edges of the multilayer structure together. It is disclosed that the film is imparted with "wrinkles" by the folding process. Similar film type honeycomb structures formed from charged films are further disclosed in related Japanese Kokai 56-10312 and 56-10313, both published Feb. 2, 1981.

Although these honeycomb structures are advantageous in view of their low pressure drop, they are often difficult to manufacture, particularly with lower basis weight nonwoven webs and can be structurally unstable. Further, there is a need for general improvements in filtration efficiency with these structures.

BRIEF SUMMARY OF THE INVENTION

A filtration media array formed of at least one layer of a flow channel assembly defined by a contoured film layer and a second film layer. The contoured film layer has a first face and a second face, a series of peaks on at least one face of the contoured film layer and at least one face of the contoured film defining flow channels having high aspect ratio structures over at least a portion of the face. The film layers are preferably electret charged with the flow channels defined by the contoured film layer and a planar second film layer with the filtration media array defined by a plurality of overlying flow channel layers.

DETAILED DESCRIPTION OF THE PREFERRED EMBODIMENT

The present invention provides a filtration media array comprised preferably of charged contoured films arranged in a honeycomb structure to form fluid flow pathways. The filtration media array of the present invention also comprises film layers where at least some of the film layers have high aspect ratio structures such as ribs, stems, fibrils, or other discrete protuberances which extend the surface area of at least one face of the film layer.

Film layers are configured in a filtration media array with the contours of the film layers defining a plurality of inlets openings into fluid pathways through a face of the array. The fluid pathways may be defined by a single contoured film layer having a cap film layer, or by adjacent contoured film layers. The fluid pathways further have outlet openings which allow fluid to pass into and through the pathways without necessarily passing through a filter layer having a flow resistance. The fluid pathways and openings of the filtration media array as such are defined by one or more flow channels formed at least in part by tile contoured film layers. The flow channels are created by peaks or ridges in the contoured film layer and can be any suitable form as long as they are arranged to create fluid pathways in conjunction with an adjacent film layer through the filtration media array. For example the flow channels can be separate discrete channels formed by repeating ridges or interconnected channels formed by peak structures. The flow channels could also be isolated channels (e.g., closed valleys surrounded by peaks or ridges) that together with a further contoured film layer define a fluid pathway (e.g. where the valleys on the adjacent contoured film layers are offset to create a continuous tortuous path through the filtration media array).

A plurality of adjacent, either separate or interconnected, flow channels (e.g., a series of flow channels aligned in a row sharing a common contoured film layer) of the filtration media array are preferably defined by a series of peaks or ridges formed by a single contoured film layer. These adjacent flow channels define a flow channel layer. The peaks or ridges in the contoured film layers may be stabilized or separated by a planar or contoured cap layer. A cap layer is a layer which is in engagement, or contact, with the peaks or ridges on one face of the contoured film layers. The peaks or ridges on the opposite face of the contoured film layer can also be joined to or in contact with a cap layer. A cap layer may cover all or only a portion of a contoured film layer. If the cap layer is a planar film layer, the cap film layer and the associated contoured film layer define fluid pathways between adjacent peaks or ridges of the contoured film layer in contact or engagemnent with the film cap layer.

Figure 8:
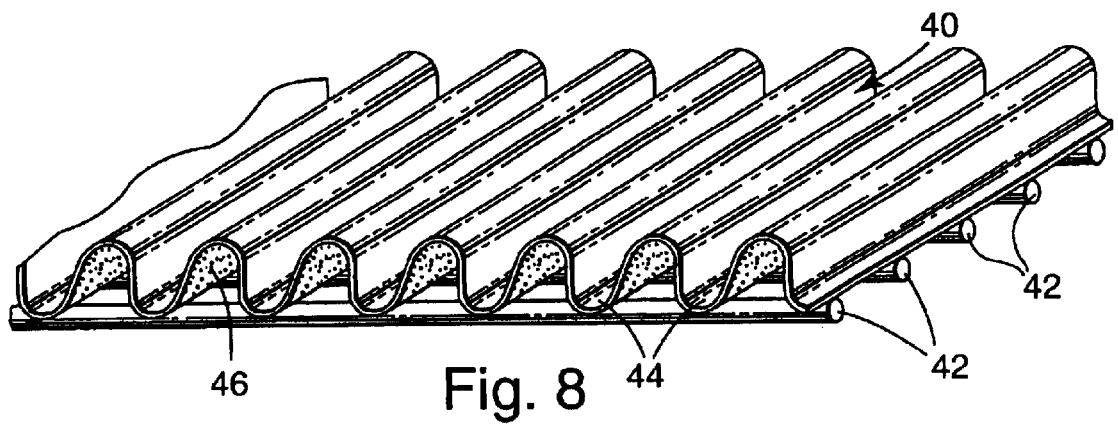
FIG. 8 is a perspective view of a contoured film layer with a stabilization layer of strands.

A cap layer can also be a functional layer such as a sorbent or particulate filter or a stabilization layer such as a series of stabilization filaments or a strengthened nonwoven. FIG. 8 shows a contoured film layer 40 having discrete stemlike structures 46 joined to stabilization filaments 42 at peaks 44 of the contoured film layer 40. In order to be useful as a filtration media array, the FIG. 8 embodiment would need to be joined at a further film layer such as a cap film layer or a further contoured film layer. If a further contoured film layer were joined to the layer of filaments 42, the fluid pathways would be formed from the two flow channel layers of the two adjacent contoured film layers.

Figure 1:
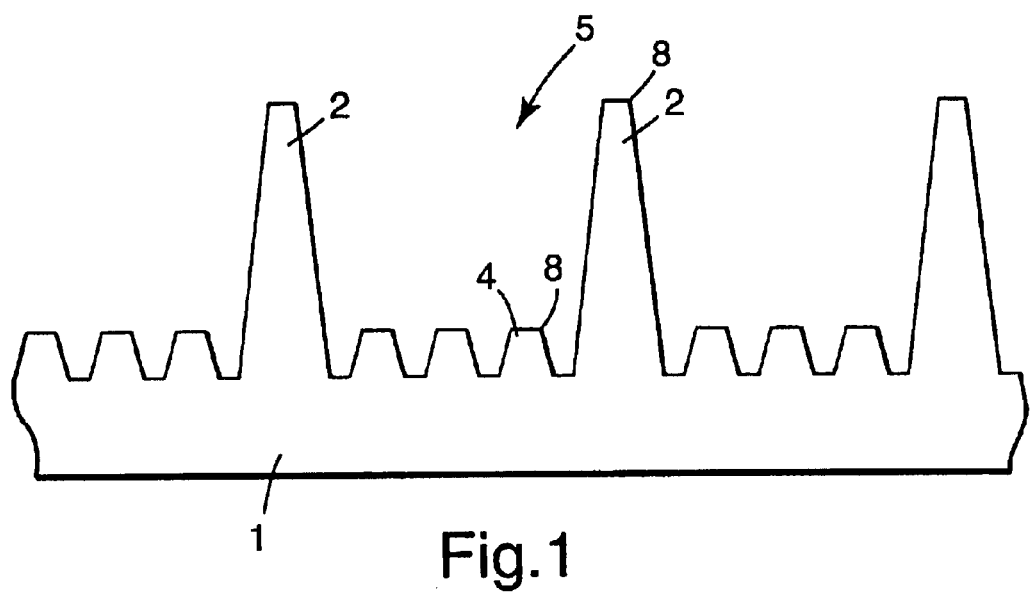
FIG. 1 is a side view of a first structured film useful in forming the invention filtration media array.
Figure 2:
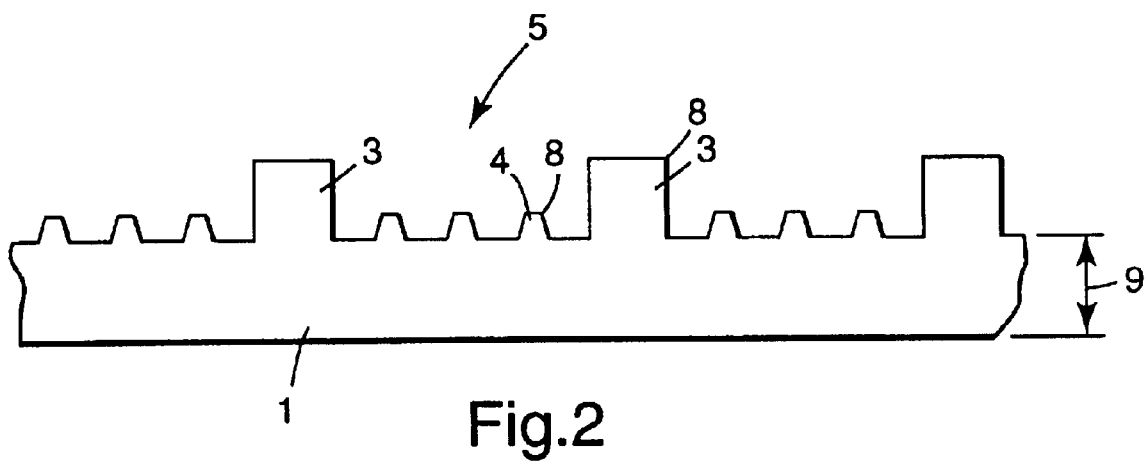
FIG. 2 is a side view of a second structured film useful in forming the invention filtration media array.
Figure 3:
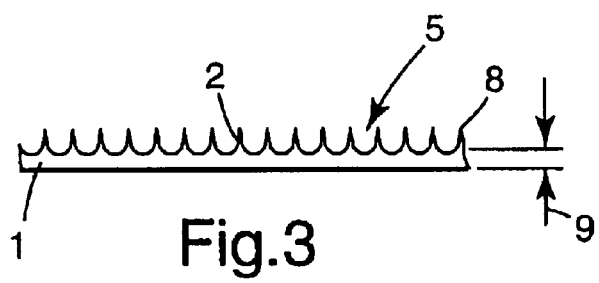
FIG. 3 is a side view of a third structured film useful in forming the invention filtration media array.
Figure 4:
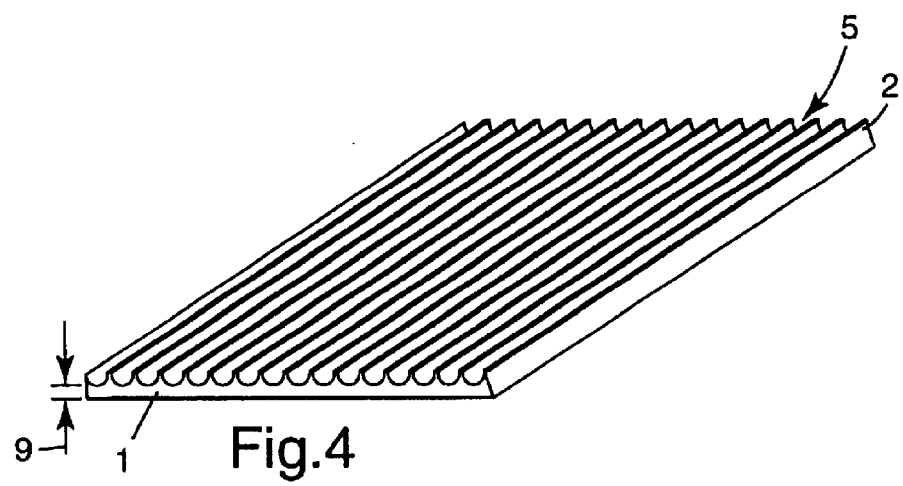
FIG. 4 is a side view of a fourth structured film useful in forming the invention filtration media array.
Figure 5:
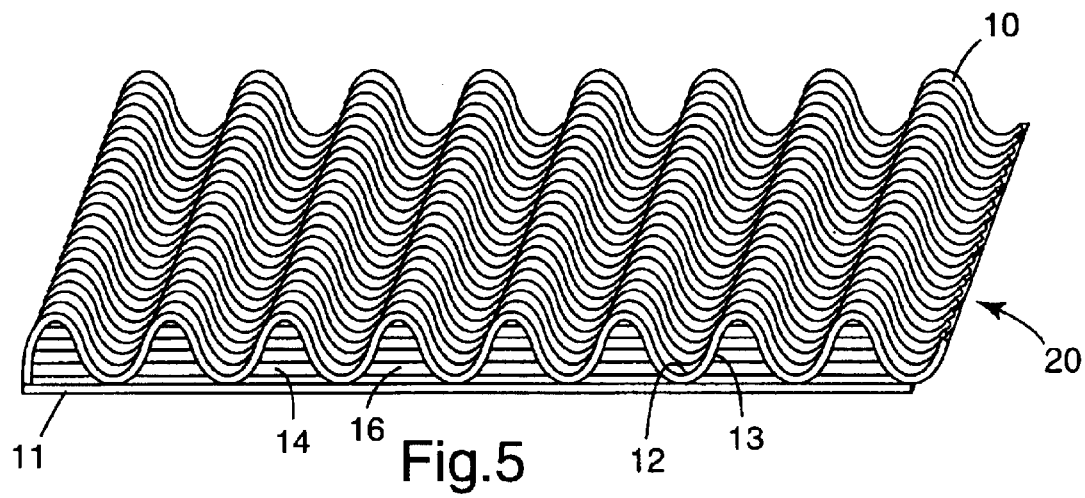
FIG. 5 is a perspective view of a contoured film and flat cap film layer assembly.
Figure 6:
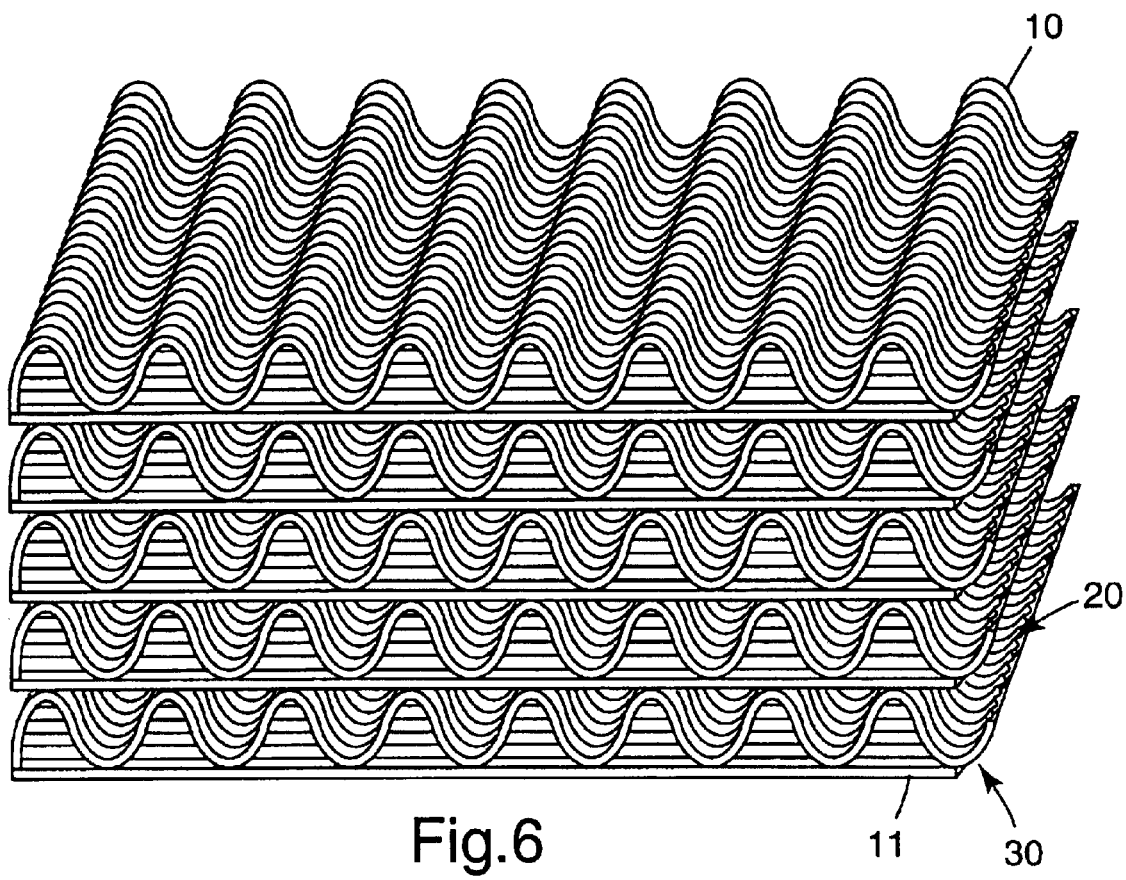
FIG. 6 is a perspective view of a first embodiment of filtration media array according to the invention formed of the FIG. 5 assembly.
Figure 9:
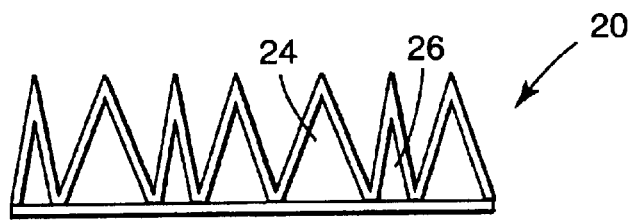
FIG. 9 is a perspective view of a contoured film layer with a flat film cap layer forming a flow channel assembly.
Figure 10:
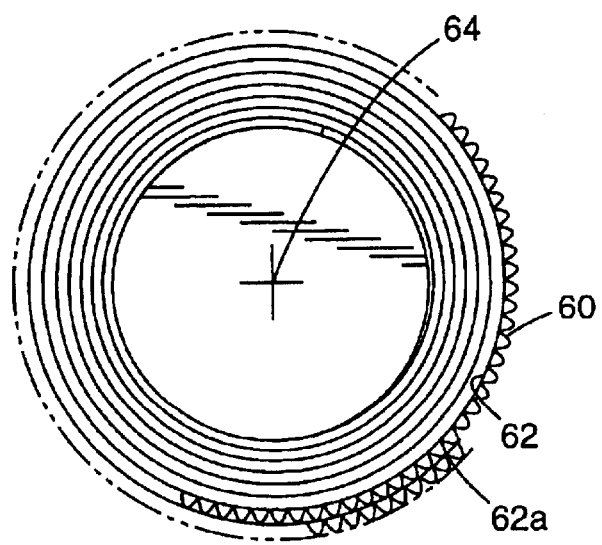
FIG. 10 is a side view of a third embodiment of a filtration media array according to the invention.

Adjacent flow channels, e.g., 14 and 16, in a flow channel layer 20, defined by a contoured film layer 10, may be all the same as shown in FIG. 5, or may be different as shown in FIG. 9. In FIG. 9, the adjacent flow channels 24 and 26 of the flow channel layer 20 are separate flow channels, which have the same height but different widths. In FIG. 5 the adjacent flow channels 14 and 16 of the flow channel layer 20 are separate flow channels which have the same height and widths. For manufacturability, preferably all, or at least a majority of the peaks or ridges forming the flow channels of the contoured film layer should have substantially the same height. Further, each adjacent flow channel layer 20 of the filtration media array 30 may have the same flow channel configurations (as shown in FIG. 6), or may be different. The flow channels of adjacent flow channel layers of a filtration media array may also be aligned (e.g., as in FIG. 6), or may be offset (e.g., at angles with respect to each other as in FIG. 7) or some combination thereof. The adjacent overlying flow channel layers of a filtration media array are generally formed from a single contoured film layer where the flow channels can be interconnected, separate, or even separate and isolated (i.e. do not extend across the entire contoured film layer). With flow channels that extend across the entire contoured film layer these channels could extend linearly or curved. Preferably, the flow channels of adjacent overlying flow channel layers are substantially parallel and aligned (FIG. 6), but they could be at diverging or converging angles. If the filtration media array is formed of cylindrically arranged flow channel layers as shown in FIG. 10, these flow channel layers can be formed of a single contoured film layer 60 with an optional cap layer 62 configured in a corkscrew or helical alignment around a central axis 64. The contoured film layer is preferably bonded to one cap layer 62 for stability during manufacturing and in frictional contact with the other cap layers 62a.

Figure 7:
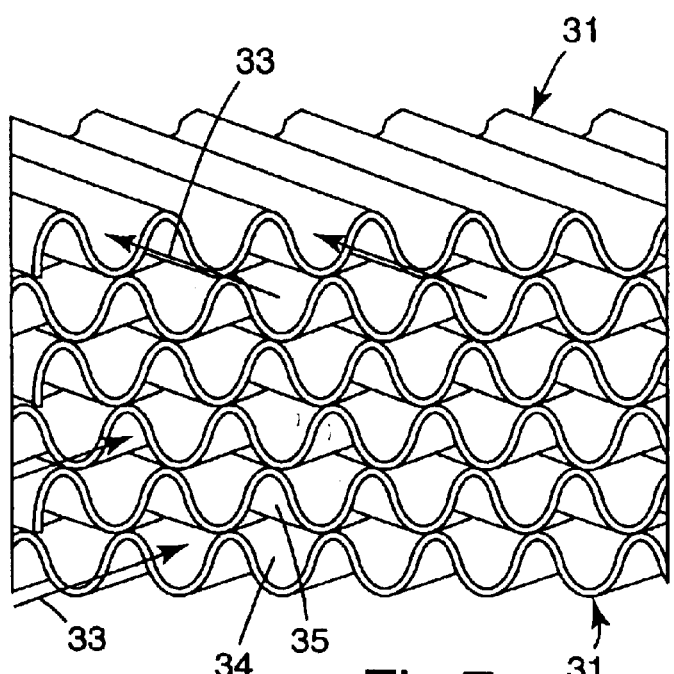
FIG. 7 is a perspective view of a second embodiment of a filtration media array according to the invention.

Pairs of contoured film layers may face one another with the facing layers engaging one another at their respective peaks as shown in FIG. 7 or be separated by one or more cap layers as shown in FIGS. 5, 6, and 10. When the contoured film layers 31 are in contact without an intervening film layer as shown in FIG. 7, the fluid pathways weave between adjacent intersecting flow channels, e.g., 34 and 35 of the contoured film layers 31.

Additional layers may also be placed between adjacent contoured film layers of the filtration media array. Additional functional layers may form one or more cap layers or contoured layers and can contain, for instance, sorbent material such as an activated carbon to facilitate gaseous contaminant removal from the air stream. The layers also can contain functional treatments to enhance particle removal or to provide other benefits such as providing oil and water repellency, removing odors, removing organic matter, removing ozone, and disinfecting, drying, and introducing fragrance. Treatment may include charging of the layers to form an electret, surface coating of the layers, or addition of further treated layers or coatings.

The flow channels provide controlled and ordered fluid flow pathways through the filtration media array. The amount of surface area available for filtration purposes is determined by available surface area of the flow channels and the number and length of these flow channels in the filtration media array. In other words, the features of the individual filtration media layers, such as the length of the flow channels, channel configurations, and the face surface area of the individual layers.

A single layer of flow channels provided by a contoured film layer may comprise a functional filtration media array in accordance with the present invention, however, preferably multiple overlying flow channel layers form the functional filtration media array. A filtration media array formed of stacked contoured structured film layers provides an ordered or engineered and mechanically stable porous structure without the pore size variability and gross irregularities of nonwoven filter webs. Any pore size variability or irregularities are planned and controlled based on the ultimate filtration needs for which the filtration media array of the present invention is intended. As a result, the fluid stream is subjected to uniform treatment as it passes through the flow channels of the filtration media array, thus enhancing its filtering efficiency. Generally, the contoured film layers forming the flow channels reinforce the filtration media array forming a structurally stable form which can be formed into a multitude of self-supporting configurations.

The filtration media array may be conformed into a variety of shapes or laid over objects without crushing and closing the flow channels. The filtration media array can also be preformed into a three-dimensional form followed by bonding the layers of adjacent flow channels to create a structurally stable form. This form can be used to direct airflow in a desired manner, without a frame, or conform to an available space, such as a duct, or create a support for a further structure. The filtration media array of the present invention is relatively stable and resistant to breakage caused by manipulation of the filtration media by, for example, pleating, handling, or assembly. Fiber breakage in traditional fibrous filters can cause a number of problems, especially in clean room application.

The contoured films of the invention are generally charged and are preferably electrostaticly charged while contoured in association with any attached cap layer or other layer. Electrostatic charging while the film is contoured unexpectedly enhances the contoured film's ability to remove particulate matter from a fluid stream, particularly when the contoured film has high aspect ratio structures. This improvement in performance is seen relative to otherwise identical filtration media arrays formed with films charged prior to being contoured.

These layered charged contoured films are characterized by surface voltages of at least +/−1.5 KV, preferable at least +/−10 KV, measured approximately one centimeter from the film surface by an electrostatic surface voltmeter (ESVM), such as a model 341 Auto Bi-Polar ESVM, available from Trek Inc., Medina, N.Y. The electrostatic charge may comprise an electret, which is a piece of dielectric material that exhibits an electrical charge that persists for extended time periods. Electret chargeable materials include nonpolar polymers such as polytetrafluoroethylene (PTFE) and polypropylene. Generally, the net charge on an electret is zero or close to zero and its fields are due to charge separation and not caused by a net charge. Through the proper selection of materials and treatments, an electret can be configured that produces an external electrostatic field. Such an electret can be considered an electrostatic analog of a permanent magnet.

Several methods are commonly used to charge dielectric materials, any of which may be used to charge a contoured film layer or other layers used in the present invention, including corona discharge, heating and cooling the material in the presence of a charged field, contact electrification, spraying the web with charged particles, and wetting or impinging a surface with water jets or water droplet streams. In addition, the chargeability of the surface may be enhanced by the use of blended materials or charge enhancing additives. Examples of charging methods are disclosed in the following patents: U.S. Pat. No. RE 30,782 to van Turnhout et al., U.S. Pat. No. RE 31,285 to van Turnhout et al., U.S. Pat. No. 5,496,507 to Angadjivand et al., U.S. Pat. No. 5,472,481 to Jones et al., U.S. Pat. No. 4,215,682 to Kubik et al., U.S. Pat. No. 5,057,710 to Nishiura et al. and U.S. Pat. No. 4,592,815 to Nakao.

In addition, one or more layers could also have active charging such as by the use of a film, with a metallized surface or layer on one face that has a high voltage applied to it. This could be accomplished in the present invention by the addition of such metallized layer adjacent to a contoured layer, or the application of a metal coating on a layer. Filtration media layers comprising such metallized layers could then be mounted in contact with an electrical voltage source resulting in electrical flow through the metallized media layers. Examples of active charging are disclosed in U.S. Pat. No. 5,405,434 to Inculet.

Another type of treatment available is the use of fluorochemical additives in the form of material additions or material coatings which can improve a filter layer's ability to repel oil and water, as well as enhance the ability to filter oily aerosols. Examples of such additives are found in U.S. Pat. No. 5,472,481 to Jones et al., U.S. Pat. No. 5,099,026 to Crater et al., and U.S. Pat. No. 5,025,052 to Crater et al.

In addition, a filter layer may he embedded, coated, or otherwise treated with a tacky substance designed to attract and adhere impinging particles. A filter layer may also be embedded, coated or otherwise treated with a chemical reactant, or other compound, designed to react in some manner with the fluid stream either to enhance filtration, or to produce an additional result. These types of compounds and results are similar to those listed above for treatment by added layers. These compounds may include sorbents, such as activated carbon, zeolite or aluminosilicate for removing organic molecules or deodorization; deodorizing catalysts such as copper-ascorbic acid for decomposition of malodorous substances; drying agents such as silica gel, zeolite, calcium chloride, or active aluminal; a disinfecting agent such as a UV germicidal system; fragrances such as gloxal, methacrylic acid esters or perfumes; or ozone removing, agents including metals such as Mg, Ag, Fe, Co, Ni, Pt, Pd, or Rn, or an oxide supported on a carrier such as alumina, silica-alumina, zirconia, diatomaceous earth, silica-zirconium, or titania.

Polymers useful in forming a structured film layer used in the present invention include but are not limited to polyolefins such as polyethylene and polyethylene copolymers, polypropylene and polypropylene copolymers, polyvinylidene diflouride (PVDF), and polytetrafluoroethylene (PTFE). Other polymeric materials include acetates, cellulose ethers, polyvinyl alcohols, polysaccharides, polyesters, polyamides, poly(vinyl chloride), polyurethanes, polyureas, polycarbonates, and polystyrene. Structured film layers can be cast from curable resin materials such as acrylates or epoxies and cured through free radical pathways promoted chemically, by exposure to heat, UV, or electron beam radiation. Preferably, the structured film layers are formed of polymeric material capable of being charged namely dielectric polymers and blends such as polyolefins or polystyrenes.

Polymeric materials including polymer blends can be modified through melt blending of plasticizing active agents or antimicrobial agents. Surface modification of a filter layer can be accomplished through vapor deposition or covalent grafting of functional moieties using ionizing radiation. Methods and techniques for graft-polymerization of monomers onto polypropylene, for example, by ionizing radiation are disclosed in U.S. Pat. Nos. 4,950,549 and 5,078,925. The polymers may also contain additives that impart various properties into the polymeric structured layer.

Figure 11:
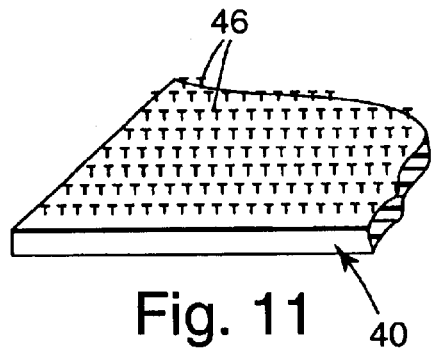
FIG. 11 is a perspective view of a fourth structured film useful in forming the invention filtration media array.

The contoured film layers and cap film layers may have structured surfaces defined on one or both faces. The high aspect ratio structures used on the contoured film and/or cap film layers of the preferred embodiments generally are structures where the ratio of the height to the smallest diameter or width is greater than 0.1, preferably greater than 0.5 theoretically up to infinity, where the structure has a height of at least about 20 microns and preferably at least 50 microns. If the height of the high aspect ratio structure is greater than 2000 microns the film can become difficult to handle and it is preferable that the height of the structures is less than 1000 microns. The height of the structures is in any case at least about 50 percent or less, of the height of the flow channels, preferably 20 percent or less. As shown in FIGS. 1–4 and 11 the structures on the film layers 1 can be in the shape of upstanding stems or projections, e.g., pyramids, cube corners, J-hooks, mushroom heads, or the like; continuous or intermittent ridges; e.g., rectangular 3 or v-shaped ridges 2 with intervening channels 5; or combinations thereof. Mushroom head projections 46 are shown in FIG. 11 on film backing 40. These projections can be regular, random or intermittent or be combined with other structures such as ridges. The ridge type structures can be regular, random intermittent, extend parallel to one another, or be at intersecting or nonintersecting angles and be combined with other structures between the ridges, such as nested ridges 4 or projections. Generally, the high aspect ratio structures can extend over all or just a region of a film 1. When present in a film region, the structures provide a surface area at least 50 percent higher than a corresponding planar film, preferably at least 100 percent higher, generally up to 1000 percent or higher. In a preferred embodiment, the high aspect ratio structures are continuous or intermittent ridges that extend across a substantial portion of the contoured film layer at an angle to the contours, preferably octagonal (90 degrees) to the contours of the contoured film layer as shown in FIGS. 5 and 6. This reinforces the mechanical stability of the contoured film layer in the flow channel assembly (FIG. 5) and the filtration media array (FIG. 6). The ridges generally can be at an angle of from about 5 to 175 degree relative to the contours, preferably 45 to 135, generally the ridges only need to extend over a significant curved region of the contoured film.

The structured surfaces can be made by any known method of forming a structured film, such as the methods disclosed in U.S. Pat. Nos. 5,069,403 and 5,133,516, both to Marantic et al., 5,691,846 to Benson et al.; 5,514,120 to Johnston et al.; to 5,175,030 to Lu et al.; 4,668,558 to Barber; 4,775,310 to Fisher; 3,594,863 to Erb or 5,077,870 to Melbye et al. These methods are all incorporated by reference in their entirety The contoured film layers are preferably provided with a high aspect ratio structure over at least 50 percent of at least one face, preferably at least 90 percent. Cap film layers or other functional film layers can also be formed of these high aspect ratio structured films. Generally the overall flow channels should have structured surfaces forming 10 to 100 percent of its surface area, preferably 40 to 100 percent.

Figure 5A:
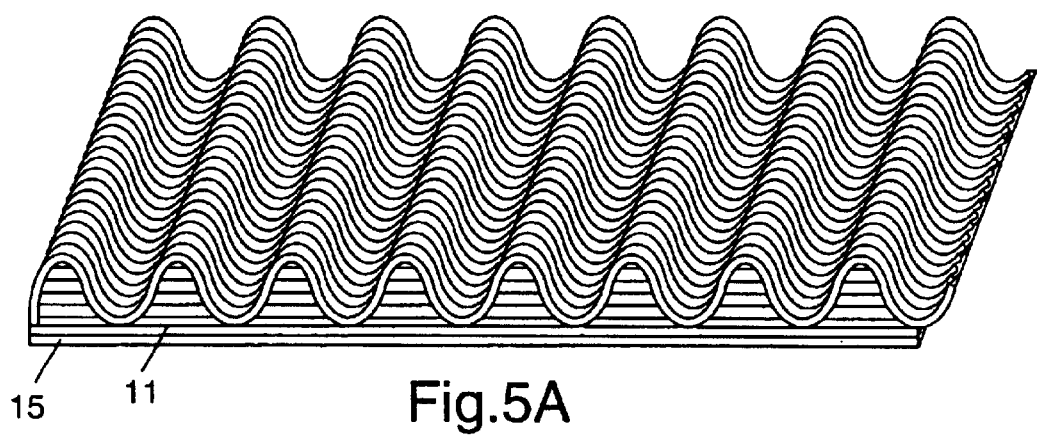
FIG. 5A is a perspective view of a contoured film and flat cap film layer assembly with an additional functional layer.

The filtration media array of the present invention starts with the desired materials from which the layers are to be formed. Suitable sheets of these materials having the required thickness or thicknesses are formed with the desired high aspect ratio surfaces and at least one of these film layers is contoured and this contoured film is stabilized by being joined to a further cap layer, a contoured layer or the like, forming the flow channels. The flow channel layers forming the filtration media array, e.g., contoured film layers and cap layers, may be bonded together, mechanically contained or otherwise held into a stable filtration media array. The contoured film and cap layers may be bonded together such as disclosed in U.S. Pat. No. 5,256,231 (extrusion bonding a film layer to a corrugated layer) or U.S. Pat. No. 5,256,231 (by adhesive or ultrasonic bonding of peaks to an underlying layer), or by melt adhering the outer edges forming the inlet and/or outlet openings. As shown in FIG. 5 a contoured structured film 10 is joined to a planar structured cap film layer 11 at the peaks 12 on one face 13 of the contoured film layer 10. One of more of these flow channel layers 20 is then stacked or otherwise layered and are oriented in a predetermined pattern or relationship, with optionally additional layers 15 (FIG. 5A), to build up a suitable volume of flow channel layers 20 in a filtration media array 30 as shown in FIG. 6. The resulting volume of flow channel layers 20 is then converted, by slicing or otherwise, into a finished filtration media array of a desired thickness and shape. This filtration media array 30 may then be used as is or mounted, or otherwise assembled into a final useable format. Any desired treatments, as described above, may be applied at any appropriate stage of the manufacturing process. In addition, the filtration media array in accordance with the present invention may be combined with other filtering material, such as a layer of nonwoven fibrous material over the face surface, or may be combined with other non-filtering material to facilitate such things as handling, mounting, assembly or use.

The filtration media array 30 is preferably formed into its final form by slicing the array with a hot wire. The hot wire fuses the respective layers together as the final filter form is being cut. This fusing of the layers is at the outermost face or faces of the final filter. As such at least some of the adjacent layers of the filtration media array 30 need not be joined together prior to the hot wire cutting. The hot wire cutter speed can be adjusted to cause more or less melting or fusing of the respective layers. For example, the hot wire speed could be varied to create higher or lower fused zones. Hot wires could be straight or curved to create filters of an unlimited number potential shapes including rectangular, curved, oval, or the like. Also, hot wires could be used to fuse the respective layers of the filtration media array without cutting or separating filters. For example, a hot wire could cut through the filtration media array fusing the layers together while maintaining the pieces on either side of the hot wire together. The pieces re-fuse together as they cool, creating a stable filtration media array.

Preferred embodiments of the invention use thin flexible polymer films having a thickness 9 of less than 200 microns, preferably less than 100 microns down to about 5 microns. Thicker films are possible but generally increase pressure drop without any added benefit to filtration performance or mechanical stability. The thickness of the other layers are likewise preferably less than 200 microns, most preferably less than 100 microns. The thickness of the layers forming the filtration media array generally are such that cumulatively less than 50 percent of the cross sectional area of the filtration media array at the inlet or outlet openings is formed by the layer materials, preferably less than 10 percent. The remaining portions of the cross sectional area form the inlet openings or outlet openings. The peaks or ridges of the contoured film generally have a minimum height of about 1 mm, preferably at least 1.2 mm and most preferably at least 1.5 mm. If the peaks or ridges are greater than about 10 mm the structures and become unstable and efficiency is quite low except for very long filter media arrays, e.g. greater than 100 cm or longer; preferably the peaks or ridges are 6 mm or less. The flow channels generally have an average cross sectional area along their length of at least about 1 $mm^2$ preferably at least 2 $mm^2$ where preferably a minimum cross sectional area is at least 0.2 $mm^2$, preferably at least 0.5 $mm^2$. The maximum cross sectional area is determined by the relative filtration efficiency required and is generally about 1 $cm^2$ or less, preferably about 0.5 $cm^2$ or less.

The shape of the flow channels is defined by the contours of the contoured film layer and the overlying cap layer or adjacent attached contoured film layer. Generally the flow channel can be any suitable shape, such as bell shaped, triangular, rectangular or irregular in shape. The flow channels of a single flow channel layer are preferably substantially parallel and continuous across the contoured film layer. However, flow channels of this type on adjacent flow channel layers can be at angles relative to each other. Also, these flow channels of specific flow channel layers can extend at angles relative to the inlet opening face or outlet opening face of the filtration media array.

In use, the invention filtration media array can be used in a variety of applications where low pressure drop is important, such as air conditioner filters, automotive cabin filters, room air cleaners, vent filters, furnace filters, medical breather filters, heat and moisture exchange devices, paint spray filters, respirator filters and the like.

DESCRIPTION OF THE EMBODIMENTS

EXAMPLES

Small Particle Challenge Test

Filtration performance of filter constrictions was evaluated in a model 8110 automatic filter tester from TSI Incorporated, St. Paul, Minn., using a heterodispersed NaCl aerosol challenge (particle size with a number mean diameter of 0.1 micrometer), at a aerosol concentration of 15 mg-NaCl/$m^3$. Each filter construction was tested sequentially at face velocities of 100, 50, and 25 cm/sec while recording the pressure drop and particle capture efficiency for the construction. Filtration performance results for each construction are reported as particle capture efficiency (%) as well as quality factor, a performance measurement, defined by the equation $$Q = -\ln(x_{pen})/\Delta P$$

where $x_{pen}$ is the fractional penetration of the particle challenge through the filter construction and $\Delta P$ is the pressure drop across the filter in $mm_{1120}$.

Example 1

Polypropylene resin, type 2.8 MFI from Fina Oil and Chemical Co., Dallas, Tex., was formed into a structured film using standard extrusion techniques by extruding the resin onto a casting roll with a micro-grooved surface. The resulting cast film had a first smooth major surface and a second structured major surface with longitudinally arranged continuous features from the casting roll. The features on the film consisted of evenly spaced first primary structures and interlaced secondary structures. The primary structures were spaced 182 μm apart and had a substantially rectangular cross-section that was 50 μm tall and 55 μm wide (a height/width ratio of about 1) at the base with a side wall draft of 5°. Three secondary structures having substantially rectangular cross-sections that were 25 μm tall and 26 μm wide at the base (height/width ratio of about 1) with a side wall draft of 22° were evenly spaced between the primary structures at 26 μm intervals. The base film layer from which the features extended was 50 μm thick.

A first layer of structured film was corrugated into a contoured shape and attached, at its arcuate peaks, to a second structured film to form a flow channel laminate layer assembly. The method generally comprises forming the first structured film into a contoured sheet, forming the film so that it has arcuate portions projecting in the same direction from spaced generally parallel anchor portions, and bonding the spaced generally parallel anchor portions of the contoured film to a second structured film backing layer with the arcuate portions of the contoured film projecting from the backing layer. This method is performed by providing first and second heated corrugating members or rollers each having an axis and including a plurality of circumferentially spaced generally axially extending ridges around and defining its periphery, with the ridges having outer surfaces and defining spaces between the ridges adapted to receive portions of the ridges of the other corrugating member in meshing relationship. The first structured film is fed between the meshed ridges while the corrugating members are counter-rotated. The ridges forming the gear teeth of both corrugating members were 3.05 mm tall and had a 8.5° taper from their base converging to a 0.64 mm wide flat top surface. Spacing between the teeth was 0.5 mm. The outer diameter of the corrugating members, to the flat top surface of the gear teeth, was 228 mm. The corrugating members were arranged in a stacked configuration with the top roll heated to a temperature of 93° C. and the bottom roll maintained at a temperature of 33° C. Engagement force between the two rolls was 123 Newtons per lineal cm of tooth width. With the corrugating apparatus configured in this manner the structure film, when passed through the intermeshing teeth of the corrugating members at a roll speed of 5.3 RPM, was compressed into and retained between the gear teeth of the upper corrugation member. With the first film registered in the teeth of the upper corrugation member the second structured film was laid over the periphery of the roll and ultrasonically welded to the layer retained in the teeth of the upper corrugation member. Welding was accomplished between the first and second film at the top surface of the teeth of the corrugation member by employing the tooth surface as an anvil against which an ultrasonic horn was brought to bear. The thus formed corrugated flow channels were 1.4 mm in height with a base width of 1.8 mm and spacing between corrugations of 0.77 mm. The corrugations had generally straight sidewall 0.7 mm high with an arcuate peak.

The flow channel layer assembly was electret charged by exposure to a high voltage field in a grid charger by the method generally described in U.S. Pat. No. 3,998,916 (van Turnhout), which is incorporated herein by reference. The channel assembly was positioned between two equidistant first and second energized corona wire grids, with the microstructure oriented toward the first grid, and the grids energized for 30 seconds to charge the assembly. The grids, which were spaced 24 mm apart, were 36.5 cm wide and contained sixteen corona wires at 28 mm spacing, were energized with −10 kV dc to the first grid and +10 kV dc to the second grid.

A filtration media array was formed from the charged flow channel layer assemblies by stacking layers (5 cm×5 cm) on top on one another, maintaining the channels in all the flow channel layers in a parallel alignment, such that the flow channel walls formed a 90° angle with a plane defined by the inlet opening face of the filter media array (90° incident angle). The filtration media array stack was converted into a stable filtration media array construction by hot-wire cutting the stack to produces filters 5 mm in depth. Cutting was done by traversing the channel assembly stack across an electric resistance heated, 0.51 mm diameter soft-temper nickel chromium wire (available from Consolidated Electric Wire & Cable, Franklin Park, Ill.) at a traverse rate of approximately 0.5 cm/sec. The amount of melting induced by the hot wire and the degree of smearing of melted resin was carefully controlled so as not to obstruct the inlet or outlet openings of the filtration media array. In addition to producing the desired filter depth, the hot wire cutting process also stabilized the final assembly into a robust, collapse resistant structure by fusing the front and rear faces of flow channel layer assemblies together forming a stabilized filtration media array. The stabilized filtration media array required no additional components (e.g. frames, supports, or reinforcements) to maintain the orientation of layers and hold the filter together.

The filtration performance of the filtration media array was characterized using the above described Small Particle Challenge Test, the results of which are reported in Table 2.

The filtration performance of this filter was also characterized in relation to its ability to capture one to five micron sized particles. The particles used in the evaluation were produced from ISO Fine Test Dust 12103-1, A2; available from PTI Inc., Burnsville, Minn. A charge neutralized aerosol of the test dust, with a concentration of 12 million particles per cubic meter, was delivered to the filter at a face velocity of 100 cm/sec. Particle concentrations up and down stream of the filter were monitored during the test procedure and the instantaneous capture efficiency determined, the results of which are reported in Table 1 below. Pressure drop across the filter during testing was 0.53 mm H20. As the data indicates, the channel flow filtration media array of the invention, while incurring a small pressure drop, is effective in capturing larger particles with the greatest efficiency at the top end of the particle size range.

TABLE 1

Filtration Performance
Large Particle Challenge

| Particle Size (micron) | Efficiency (%) |
|---|---|
| 1.0 | 7 |
| 2.0 | 13 |
| 3.0 | 20 |
| 5.0 | 37 |

Example 2

A filter was prepared substantially as described in Example 1 except that the channel depth was 10 mm. The filtration performance of the filtration media array was characterized using the above described Small Particle Challenge Test, the results of which are reported in Table 2.

Example 3

A filter was prepared substantially as described in Example 1 except that the channel depth was 20 mm. The filtration performance of the filter was characterized using the above described Small Particle Challenge Test, the results of which are reported in Table 2.

Example 4

A filter was prepared substantially as described in Example 1 except that the channel depth was 40 mm. The filtration performance of the was characterized using the above described Small Particle Challenge Test, the results of which are reported in Table 2.

Example 5

A filter was prepared substantially as described in Example 1 except that the flow channel layers were stacked such that the flow channel assembly stack was hot wire cut at 19° bias to the channel walls to produce a filter in which the channel walls formed a 71° angle with the plane defined by the filter face (71° incident angle). This filter construction had an obstructed line-of-sight when the face of the filter was placed normal to the challenge stream, thus providing a direct impact surface for particles. The filtration performance of the filter was characterized using the above described Small Particle Challenge Test, the results of which are reported in Table 2.

Comparative Example C1

The filtration performance of a commercially available fibrous honeycomb filter having alternating layers of contoured and flat layers with contour corrugations nominally 2 mm tall and spaced 5 mm apart, a channel depth of 5 mm, and a 90° incident angle, which is used in air conditioning applications, was characterized using the above described Small Particle Challenge Test, the results of which are reported in Table 2.

Comparative Example C2

The filtration performance of a very low pressure drop flat electret charged filter media (3M Filtrete type GSB-20-NB filter material, available from 3M, St. Paul, Minn.) was characterized using the above described Small Particle Challenge Test, the results of which are reported in Table 2.

TABLE 2

Filtration Performance
Small Particle Challenge

| Example | Face Velocity (cm/sec) | Pressure Drop ($mm_{H_2O}$) | Efficiency (%) | Q Factor |
|---|---|---|---|---|
| 1 | 100 | 0.3 | 17 | 0.6 |
|   | 50 | 0.1 | 24 | 2.7 |
|   | 25 | <0.1 | 39 | — |
| 2 | 100 | 0.5 | 25 | 0.6 |
|   | 50 | 0.2 | 37 | 2.3 |
|   | 25 | 0.1 | 58 | 8.7 |

TABLE 2-continued

Filtration Performance
Small Particle Challenge

| Example | Face Velocity (cm/sec) | Pressure Drop (mm$_{H2O}$) | Efficiency (%) | Q Factor |
|---------|------------------------|----------------------------|----------------|----------|
| 3 | 100 | 1.0 | 39 | 0.5 |
|   | 50  | 0.4 | 57 | 2.1 |
|   | 25  | 0.2 | 76 | 7.1 |
| 4 | 100 | 1.7 | 57 | 0.5 |
|   | 50  | 0.8 | 74 | 1.7 |
|   | 25  | 0.3 | 87 | 6.8 |
| 5 | 100 | 0.4 | 18 | 0.5 |
|   | 50  | 0.2 | 26 | 1.5 |
|   | 25  | <0.1 | 43 | — |
| C1 | 100 | 0.4 | 10 | 0.3 |
|    | 50  | 0.1 | 7  | 0.7 |
|    | 25  | <0.1 | 6 | — |
| C2 | 100 | 2.3 | 17.1 | 0.1 |

Example 6

A structured film was prepared substantially as described in Example 1 except that 2.8 Melt Flow Index(MFI) polypropylene resin was replaced with type 100 MFI polypropylene resin, available from Fina Oil and Chemical Co. and the size of the surface features of the resulting stuctured film were larger. The first configuration fins had a substantially rectangular cross-section that was 70 μm tall and 55 μm wide at their base with a side wall draft of 5° and the second configuration fins had a substantially rectangular cross-section that was 39 μm tall and 26 μm wide at their base with a side wall draft of 22°. Thickness of the base film layer from which the features extended was 30 μm.

The film was corrugated and simultaneously laminated to a second film as described in Example 1. The resulting corrugations of the structure were 2 mm tall and 1.8 mm wide at their base with spacing between corrugations of 0.77 mm. The corrugations had generally straight sidewalls 1.1 mm high with an arcuate top. The flow channel layer assembly was electret charged and formed into a filter as described in Example 1 with a channel depth of 10 mm and an incident angle of 90°.

The filtration performance of the filtration media array was characterized using the above described Small Particle Challenge Test, at face velocities of 10 and 20 cm/sec, the results of which are reported in Table 3.

Example 7

A filter was prepared and tested substantially as described in Example 6 except that the structured films were individually electret charged, using the charging apparatus and process described in Example 1, prior to forming into the flow channel assembly. The filtration performance of the filter assembly was characterized using the above described Small Particle Challenge Test, at face velocities of 10 and 20 cm/sec, the results of which are reported in Table 3.

Example 8

A filter was prepared and tested substantially as described in Example 6 except that no electret charging was applied to either the structured films or channel assembly. The filtration performance of the filter was characterized using the above described Small Particle Challenge Test, at face velocities of 10 and 20 cm/sec, the results of which are reported in Table 3.

Example 9

A filter was prepared and tested substantially as described in Example 6 except that a matte finish flat film, prepared by extruding the 100 MFI polypropylene resin onto a matte finish casting roll to a nominal film thickness of 60 μm, was substituted for both structured films. The filtration performance of the filter was characterized using the above described Small Particle Challenge Test, at face velocities of 10 and 20 cm/sec, the results of which are reported in Table 3.

Comparative Examples C3

A filter was prepared and tested substantially as described in Example 7 except that the matte finish flat film of Example 9 was substituted for both structured films. The filtration performance of the filter was characterized using the above described Small Particle Challenge Test, at face velocities of 10 and 20 cm/sec, the results of which are reported in Table 3. The initial efficiency was lower than Example 7.

Comparative Example C4

A filter was produced and tested substantially as described in Example 8 except that the matte finish flat film of Example 9 was substituted for both structured films. The filtration performance of the filter was characterized using the above described Small Particle Challenge Test, at face velocities of 10 and 20 cm/sec, the results of which are reported in Table 3. The initial efficiency was lower than Example 8.

Example 10

A filter was prepared and tested substantially as described in Example 6 except that the structured film was replaced with the ethylene/propylene copolymer post component of a KN-2397 mechanical fastener (available from 3M, St. Paul, Minn.). The features of the post component were cylindrical shaped posts with a rounded mushroom top, evenly spaced on 600 μm centers and a density of 387 posts/cm$^2$. The cylindrical portion of the post were 265 μm in diameter and extended 246 μm from the base and were capped with a mushroom top 64 μm high and 382 μm in diameter. Thickness of the base film layer from which the features extended was 142 μm. The filtration performance of the filter was characterized using the above described Small Particle Challenge Test, at face velocities of 10 and 20 cm/sec, the results of which are reported in Table 3.

TABLE 3

Filtration Performance
Small Particle Challenge

| Example | Face Velocity (cm/sec) | Efficiency (%) |
|---------|------------------------|----------------|
| 6 | 10 | 56 |
|   | 20 | 45 |
| 7 | 10 | 36 |
|   | 20 | 29 |
| 8 | 10 | 26 |
|   | 20 | 20 |
| 9 | 10 | 36 |
|   | 20 | 29 |
| C3 | 10 | 34 |
|    | 20 | 27 |

TABLE 3-continued

Filtration Performance
Small Particle Challenge

| Example | Face Velocity (cm/sec) | Efficiency (%) |
|---------|------------------------|----------------|
| C4      | 10                     | 24             |
|         | 20                     | 18             |
| 10      | 10                     | 58             |
|         | 20                     | 48             |

The filtration performance data presented in Table 3 clearly shows a performance advantage for filter constructions based on structured films or the KN-2397 post component microstructured film as compared to constructions based on a matte film. The data also demonstrates a performance advantage when either the structured film or the matte film is electret charged as a channel filter assembly construction. A more significant and unexpected performance advantage was realized, however, when the channel flow assemblies were electret charged as a laminate structure as compared to the structured films being electret charged prior to being assembled into the flow channel assembly.

Example 11

A length of a single layer of corrugated, structured film, formed and charged as described in Example 1, was converted into a filter construction with channels oriented in a cylindrical helix configuration. The strip of material was cut from the corrugated film by making two parallel razor cuts, spaced 25.4 mm apart and at a 40° angle bias to the channels, along the length of the film. This strip was subsequently rolled upon itself, keeping the two cut edges parallel, to form a 4 cm diameter cylindrically configured filter. The channels of the filter were arrayed as a helix with a channel incident angle of 50°. The configuration of cylindrical filter was fixed by passing a hot wire through the body of the cylinder, midway between the cut edges and normal to its axis, and allowing the two cut faces to re-fuse. The filter demonstrated a pressure drop of 1.5 mm H20 with a capture efficiency of 25% when its filtration performance was characterized with the above described Small Particle Challenge Test, at a face velocity of 106 cm/sec.

Example 12

A flow channel layer assembly sheet was formed and charged substantially as described in Example 1 except that a sheet of Filtrete, 3M type GSB-20-NB, filter material was substituted for the non-corrugated layer of the flow channel assembly. The filter was assembled substantially as described in Example 11 except that flow channel assembly strip was cut from the sheet at a 90° angle bias to the channels to produce a filter having a 90° incident angle. The filter demonstrated a pressure drop of 1.5 mm $H_2O$ with a capture efficiency of 17% when its filtration performance was characterized with the above described Small Particle Challenge Test, at a face velocity of 100 cm/sec.

Example 13

The filter media array prepared as in Example 1 was evaluated in a Loading Challenge Test in which the filter was challenged with a continuous stream of aerosolized particles while monitoring the pressure drop across the filter. The particle challenge for the loading test was Japanese Industrial Standard (JIS) dust No. 15, which was continuously delivered to the filter at a concentration of 0.35 g/m$^3$ and at a face velocity of 100 cm/sec. The elapsed time of the loading challenge was noted and the weight of the captured particles was gravimetrically determined when the pressure drop across the filter reached 1.53 mm $H_2O$. Results of the Loading Challenge Test are reported in Table 4.

Comparative Example C5

The filtration performance of the commercially available fibrous honeycomb filter described in Comparative Example C1 was evaluated for loading capacity by the test method described in Example 15. Results of the Loading Challenge Test are reported in Table 4.

TABLE 4

Loading Challenge Test

|                      | Loading Duration (min) | Loading Weight (g) |
|----------------------|------------------------|--------------------|
| Example 13           | 36                     | 3.75               |
| Comparative Example C5 | 24                   | 2.19               |

The filtration performance data presented in Table 4 clearly shows a performance advantage for the filter construction of the invention based on microstructured film as compared to the commercially available fibrous honeycomb filter in terms of both the service life and loading capacity of the filter. The filter of the present invention had a 50% longer performance life as well as a 71% greater loading capacity than that exhibited by the fibrous honeycomb filter construction of Comparative Example C3.

Example 14

A filter media array was prepared as described in Example 2 and evaluated in a Small Particle Performance Life Test using a NaCl particle challenge which was delivered to the filter at a concentration of 15 mg/m3, a flow rate of 80 l/min, and at a face velocity of 100 cm/sec by a TSI test apparatus like that described in Example 1. The filter was exposed to a continuous stream of the aerosolized particle challenge for a period of two hours, after which the weight of captured particles was gravimetrically determined. Results of the Small Particle Performance Life Test are reported in Table 5.

Example 15

A filter media array was prepared as described in Example 7 and evaluated in a Small Particle Performance Life Test described in Example 14. Results of the Small Particle Performance Life Test are reported in Table 5

Comparative Example 6

Filtration performance of a flat film honeycomb filter, prepared as described in Example 9, was evaluated by the Small Particle Performance Life Test described in Example 16. Results of the Small Particle Performance Life Test are reported in Table 5.

TABLE 5

Small Particle Performance Life Test

| Example | Loading Weight (mg) | Performance Life Capture Efficiency (%) |
|---|---|---|
| 16 | 32 | 22 |
| 17 | 11 | 8 |
| C6 | 3 | 2 |

The filtration performance data presented in Table 5 clearly show a performance advantage for both filter constructions of the invention compared to a filter formed from flat film. The weight of particles captured by a filter of the invention, in which the structured film was charged prior to the channel structure formation, was 266% greater that of the flat film example. For a filter of the invention, where the channel structure was electret charged, a 966% improvement over the comparative example was seen.

What is claimed is:

1. A method of forming a filtration media array comprising the steps of:
   (a) forming a contoured polymeric dielectric film layer;
   (b) joining the contoured film layer to a second layer at at least one face of the contoured film layer so as to stabilize the contoured film layer and form flow channels and form a flow channel layer assembly; and
   (c) electrostaticly charging the flow channel layer assembly of the contoured film layer and the second layer with an electret charge to form a charged filtration media array.

2. The method of forming a filtration media array of claim 1 further comprising layering multiple charged filtration media arrays formed by steps (a)—(c) so as to create a filter having multiple flow channel layers.

3. The method of forming a filtration media array of claim 2 further comprising joining the adjacent flow channel layers by partially melting at least one face of the multilayer flow channel assembly.

4. A method of forming a filtration media array comprising the steps of:
   (a) forming a contoured polymeric film layer;
   (b) joining the contoured film layer to a second layer at least one face of the contoured film layer so as to stabilize the contoured film layer and form a series of adjacent flow channels and form a flow channel layer assembly;
   (c) layering the flow channel layer assembly so as to create a filtration media array having multiple flow channel layers forming fluid pathways through the filtration media array; and
   (d) slicing the filtration media array, while maintaining contoured film layer in the form of the channels, with a hot wire so as to fuse the adjacent layers forming the filtration media array into its final form where the cut rate is controlled so as not to completely obstruct the openings of the filtration media array while forming a dimensionally stable filter.

5. The method of forming a filtration media array of claim 4 further comprising separating a portion of the filtration media array sliced by the hot wire.

* * * * *